No. 713,844. Patented Nov. 18, 1902.
M. A. BOYLAN.
DEVICE FOR CONSTRUCTING AND CURING CONTINUOUS RUBBER TIRES.
(Application filed July 22, 1902.)
(No Model.)

Witnesses:
Walter Bowman.
A. N. Bliss

Inventor:
Michael A. Boylan
by Humphrey & Humphrey,
Attorneys.

UNITED STATES PATENT OFFICE.

MICHAEL A. BOYLAN, OF AKRON, OHIO, ASSIGNOR OF ONE-THIRD TO DAYTON A. DOYLE, OF AKRON, OHIO.

DEVICE FOR CONSTRUCTING AND CURING CONTINUOUS RUBBER TIRES.

SPECIFICATION forming part of Letters Patent No. 713,844, dated November 18, 1902.

Application filed July 22, 1902. Serial No. 116,495. (No model.)

*To all whom it may concern:*

Be it known that I, MICHAEL A. BOYLAN, a citizen of the United States, residing at Akron, in the county of Summit and State of Ohio, have invented a certain new and useful Improvement in Devices for Constructing and Curing Continuous Rubber Tires, of which the following is a specification.

My invention has a general relation to improvements in machinery for the construction and vulcanization of rubber tires for vehicles, particularly of the "clencher" pneumatic type; and it has especial relation to improvements in devices for constructing and curing continuous circular tires as distinguished from tires that are made in lengths to surround the metallic tire on the wheel-felly and whose ends are afterward joined.

The object of my invention is to provide a device on which this endless tire can be built up and which may become a part of a mold in which the tire can be vulcanized.

A further object is to so form this device as to produce the flanges requisite for and peculiar to the clencher tire, and a final object is to dispense with the expensive mechanism for joining the ends of tires that are not made annular, and thereby avoid loss of time incident to joining such ends and also any weakness of joint by making all parts homogeneous and simultaneously.

To the accomplishment of the aforesaid objects my invention consists in the peculiar and novel construction, arrangement, and combination of parts hereinafter described and then specifically claimed, reference being had to the accompanying drawings, forming a part of this specification.

Figure 1:
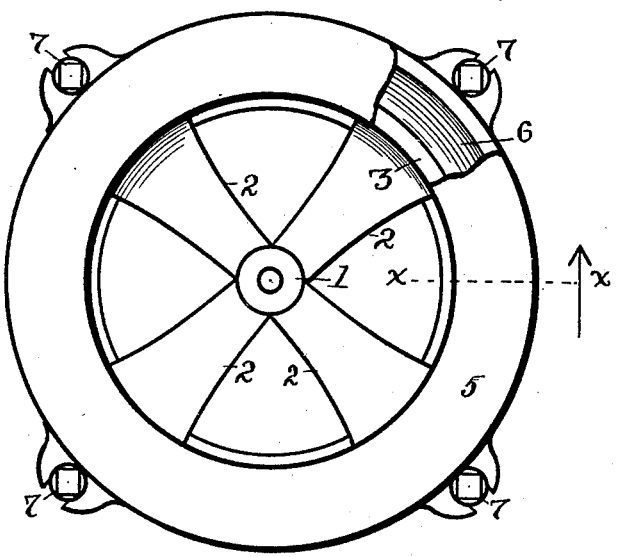
Figure 2:
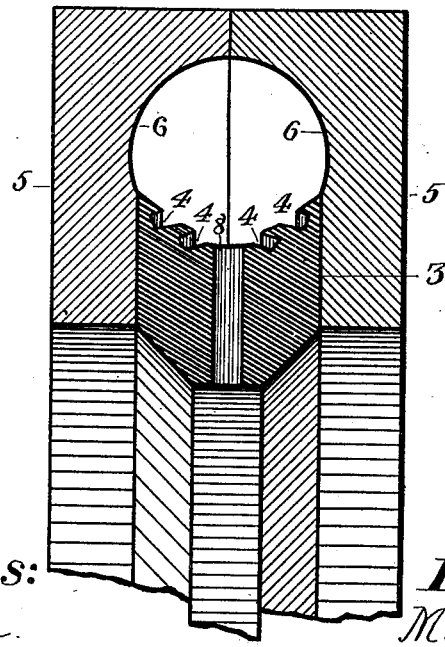

In the accompanying drawings, in which similar reference-numerals indicate like parts in the different figures, Figure 1 is a side elevation of my improved tire-mold with portions broken away to illustrate its construction, and Fig. 2 an enlarged section of Fig. 1 at the line $x$.

Referring to the drawings, 1 is a hub of a wheel, from which radiate spokes 2, bearing a felly 3, which latter constitutes one portion of a three-part mold. The outer periphery of this felly is channeled in cross-section in form of a truncated triangle, with the base outward to give to the inner periphery of the tire the proper configuration to fit the channeled metallic tire of the wheel it is to inclose. This channel will differ in cross-section to adapt the tire to any particular form of channeled metallic rim. In each side of the channel of this wheel are lateral concentric diverging grooves 4 to form protruding ridges or flanges in the sides of the base of the tire to fit corresponding grooves in the sides of the metal wheel-rim and "clench" the tire therein. This wheel fits between two side pieces 5, having in their inner opposite faces like grooves 6, conformed to receive the round part of the tire and form with the felly 3 of the wheel a complete mold. The three elements of this mold are arranged to accurately register and are held together by bolts 7 or other preferred means.

In operation the wheel-hub can be mounted on a mandrel or stub-shaft extending from a post or bench or like support, where the wheel is readily accessible on all sides, and the tire built up thereon from any desired or approved constituent elements, as canvas, wires, and unvulcanized rubber. This is of particular importance, as it enables the operator to make a more perfect tire than if the felly or its equivalent only was employed and not revolubly supported. The wheel with its tire is then placed between the side pieces 5, the whole clamped together and placed in a receptacle known to the trade as a "vulcanizer-press," and submitted to heat until the tire is cured. In placing the unvulcanized tire on the molding-felly 3 the valve or inflating-tube of the tire is placed in the opening 8 so as to extend therefrom, and during the vulcanizing of the tire a heating medium, as steam, is forced into the interior of the same through the inflating-tube in the opening 8.

The invention contemplates a number of like molding-wheels to be used with the same side pieces, so that tires can be built up on one while another tire is being cured, thereby avoiding the cooling of the side pieces and consequent loss of heat and time.

I am aware that a three-part mold consisting of side pieces and an "annulus" is not new, and such I do not broadly claim; but What I do claim, and desire to secure by Letters Patent, is—

1. An improved tire-mold consisting of a wheel having a supporting-hub with its outer periphery shaped to form the inner periphery of a continuous rubber tire, and side pieces having grooves to form the round and tread portions of the tire, said wheel and side pieces being arranged to register substantially as shown and described.

2. An improved tire-mold consisting of a wheel having a supporting-hub with the outer periphery of said wheel having lateral flanges with internal concentric grooves shaped to form the inner periphery of a continuous rubber tire with lateral ridges or fillets to fit corresponding grooves in a channeled metallic wheel-rim, and side pieces to register with the felly of said wheel-mold and having grooves to form therewith a mold for an annular clencher-tire, substantially as shown and described.

3. An improved three-part mold consisting of a ring having lateral flanges with internal concentric grooves shaped to form the inner periphery of a continuous rubber tire with lateral ridges or fillets to fit corresponding grooves in a channeled clencher wheel-rim and side pieces to register with said ring having grooves to form therewith a mold for an annular clencher-tire, substantially as shown and described.

In testimony that I claim the above I hereunto set my hand in the presence of two subscribing witnesses.

MICHAEL A. BOYLAN.

In presence of—
C. P. HUMPHREY,
C. E. HUMPHREY.